(12) United States Patent
Hanaoka et al.

(10) Patent No.: US 7,472,808 B2
(45) Date of Patent: Jan. 6, 2009

(54) POWDER AND GRANULAR MATERIAL METERING DEVICE

(75) Inventors: Kazunari Hanaoka, Nagoya (JP); Satoshi Ishii, Tokyo (JP)

(73) Assignee: Matsui MFG. Co., Ltd., Osaka (JP)

( * ) Notice: Subject to any disclaimer, the term of this patent is extended or adjusted under 35 U.S.C. 154(b) by 302 days.

(21) Appl. No.: 10/511,359

(22) PCT Filed: Jun. 10, 2003

(86) PCT No.: PCT/JP03/07381

§ 371 (c)(1),
(2), (4) Date: Oct. 12, 2004

(87) PCT Pub. No.: WO2004/005863

PCT Pub. Date: Jan. 15, 2004

(65) Prior Publication Data

US 2005/0167449 A1    Aug. 4, 2005

(30) Foreign Application Priority Data

Jul. 5, 2002   (JP)   .............................. 2002-196602
Jul. 5, 2002   (JP)   .............................. 2002-196604

(51) Int. Cl.
*B65D 88/54* (2006.01)
(52) U.S. Cl. ..................... 222/285; 222/306; 222/334; 222/438; 222/440; 222/450
(58) Field of Classification Search ................. 222/285, 222/305, 306, 307, 438, 440, 394, 425, 450, 222/451, 432, 334
See application file for complete search history.

(56) References Cited

U.S. PATENT DOCUMENTS 868,641 A * 10/1907 Clark ......................... 222/439

(Continued)

FOREIGN PATENT DOCUMENTS

CN          2350735 Y       11/1999

(Continued)

OTHER PUBLICATIONS

Office Action in Chinese Patent App. No. 03812636.2 (counterpart of present U.S. application), with English translation.

(Continued)

*Primary Examiner*—Frederick C. Nicolas
(74) *Attorney, Agent, or Firm*—R. Neil Sudol; Henry D. Coleman; William J. Sapone

(57) ABSTRACT

A powder body metering apparatus for metering a powder body such as a synthetic resin raw material is structured such that a powder body outlet of a metering container of another metering apparatus is connected to a second opening (50), whereby a powder body transport system is constructed, the powder body within the metering container of the other metering apparatus can be transported to a predetermined place via a metering container (32), by finishing a discharge of the powder body within the metering container (32), thereafter keeping a switch valve (36) in a closed state, filling the powder body in the metering container of the other metering apparatus and thereafter generating a gas stream toward a first opening (49) from the second opening (50), thus the metering container (32) being utilized as a part of a transport pipe.

2 Claims, 4 Drawing Sheets

U.S. PATENT DOCUMENTS

| | | | | |
|---|---|---|---|---|
| 1,891,038 | A | * | 12/1932 | Barros ......................... 222/438 |
| 2,588,206 | A | * | 3/1952 | Clark .......................... 222/439 |
| 3,140,018 | A | * | 7/1964 | Miller ......................... 222/283 |
| 4,002,268 | A | * | 1/1977 | McKinney ..................... 222/1 |
| 4,108,337 | A | * | 8/1978 | Iijima ......................... 222/636 |
| 4,505,407 | A | * | 3/1985 | Johnson ................... 222/181.1 |
| 4,893,966 | A | * | 1/1990 | Roehl .......................... 406/127 |
| 5,542,583 | A | * | 8/1996 | Boyer et al. ................. 222/425 |
| 6,283,680 | B1 | * | 9/2001 | Vidal .......................... 406/128 |
| 7,383,971 | B2 | * | 6/2008 | Hanaoka ..................... 222/440 |

FOREIGN PATENT DOCUMENTS

| | | |
|---|---|---|
| JP | 2-212743 | 8/1990 |
| JP | H03-096473 | 10/1991 |
| JP | 05-045525 | 6/1993 |
| JP | 11-002552 | 1/1999 |
| JP | 2002-148092 | 5/2002 |

OTHER PUBLICATIONS

Office Action from Japanese counterpart case No. 2002-196602, mailed Jul. 2, 2008 (translated into English).

* cited by examiner

POWDER AND GRANULAR MATERIAL METERING DEVICE

TECHNICAL FIELD

The present invention relates to a powder body metering apparatus which is preferable for metering a powder body such as a synthetic resin raw material or the like.

BACKGROUND ART

The following structure has been conventionally known as this kind of metering apparatus.

A conventional metering apparatus has a metering container including an inlet in an upper end and a horizontal outlet in an upper side portion, a switch valve for opening and closing the inlet of the metering container, and an upward discharge pipe connected to the horizontal outlet, and is structured such that the metering container has an upper tube, a lower tube fitted to and covered on the upper tube so as to be freely adjusted in a vertical position, and a porous body provided in a lower end of the lower tube and not allowing a powder body having a set magnitude to pass through but allowing a gas to pass through (refer to Japanese Unexamined Patent Publication No. 2002-148092).

The conventional metering apparatus mentioned above has the following disadvantage.

Since the porous body (which does not allow the powder body having the set magnitude to pass through but allows the gas to pass through) is provided in the lower end of the lower tube, it is impossible to flow the powder body into the metering container from an external portion of the porous body, so that there is a disadvantage that it is impossible to use the metering container itself as a part of a transport pipe (in other words, it is impossible to feed the powder body within the metering container of another metering apparatus to a reservoir tank or the like via the metering container).

DISCLOSURE OF THE INVENTION

The present invention employs the following means for solving the disadvantage mentioned above.

(1) In accordance with a first aspect of the present invention, there is provided a powder body metering apparatus having a metering container including an inlet in an upper end, and a switch valve for opening and closing the inlet of the metering container, wherein an internal capacity of the metering container is variable, and has a first opening in a lower portion and a second opening in a desired portion.

(2) In accordance with a second aspect of the present invention, there is provided a powder body metering apparatus, wherein a powder body discharge port is formed in the lower portion of the metering container, and the powder body discharge port is freely opened and closed by a closing member.

The present invention achieves the following effect on the basis of the structures mentioned above.

(1) In accordance with the invention of the first aspect, the powder body within the metering container can be discharged from the first opening by generating the gas flow from the second opening toward the first opening, and the powder body within the metering container can be discharged from the second opening by generating the gas flow from the first opening toward the second opening. Accordingly, since the metering container itself can be used as a part of the transport pipe for the powder body, the metering container can be built in a currently widely used powder body transport system so as to be effectively used as the metering apparatus doubling as the transport pipe.

(2) In accordance with the invention of the second aspect, since the powder body can be discharged from the powder body discharge port by opening the powder body discharge port, it is possible to easily meter and confirm the weight or the like of the powder body metered by the metering container.

BEST MODE FOR CARRYING OUT THE INVENTION

Figure 1:
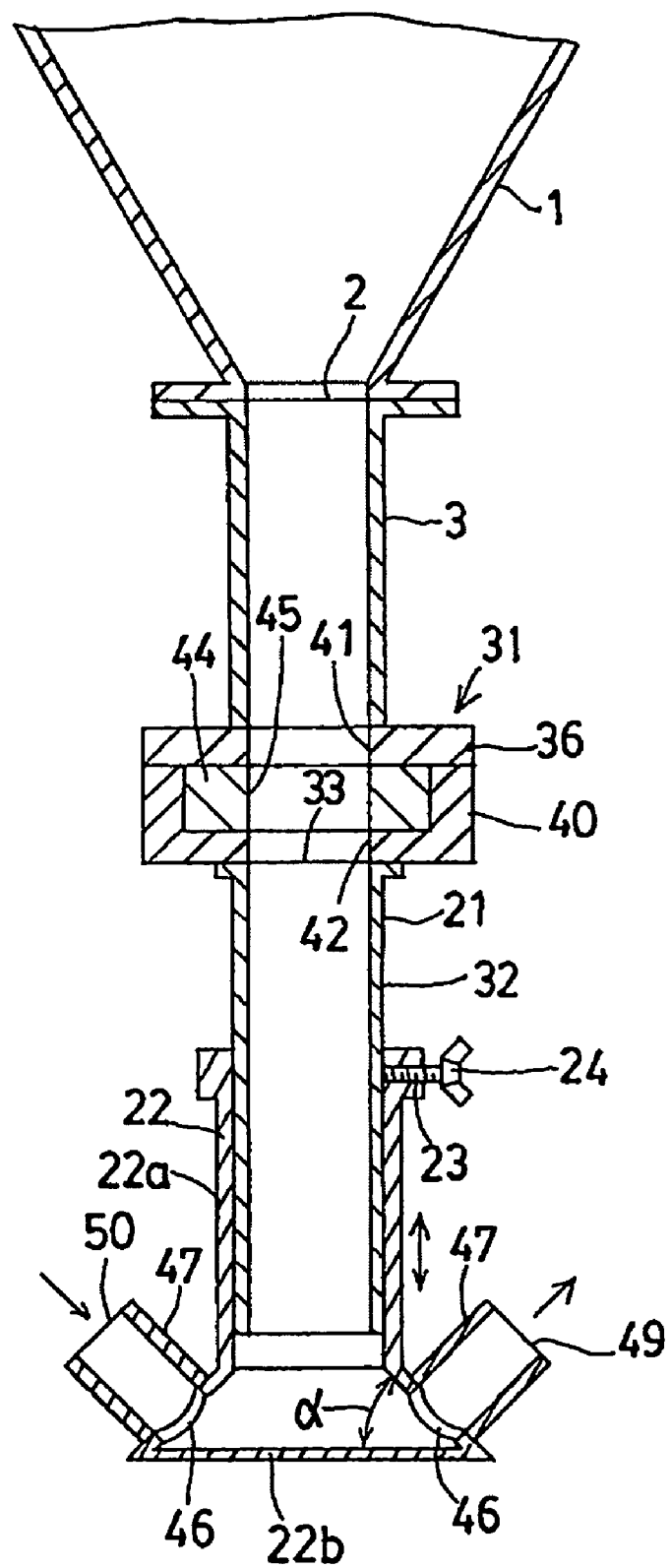
FIG. 1 is a cross sectional view of a main portion showing a first embodiment in accordance with the present invention.

A description will be given below of four embodiments in accordance with the present invention.

In this case, the same members will be shown by the same reference numerals in this description.

First Embodiment

Refer to FIG. 1

A vertical guide tube 3 is connected to an outlet 2 of a reservoir hopper 1 reserving a powder body, and a metering apparatus 31 is mounted to a lower end of the guide tube 3.

The metering apparatus 31 has a metering container 32 including an inlet 33 in an upper end, and a switch valve 36 opening and closing the inlet 33 of the metering container 32 and connected to a lower end of the guide tube 3. The metering container 32 is variable in an internal capacity on the basis of a structure described below in detail, and has a first opening 49 in a lower portion and a second opening 50 in a desired portion, a lower portion in the present embodiment.

The metering container 32 has an upper tube or hollow cylinder 21 with a vertical axis and with the inlet 33 provided in an upper end, and a lower tube or hollow cylinder 22 slidably inserted about the upper tube 21 so as to be freely adjusted in a vertical position by translation or linear shifting relative to the upper tube 21.

The lower member 22 has a tube portion 22a with a vertical axis, and a hollow closed-end circular truncated cone portion 22b provided in a lower portion of the tube portion 22a and open in an upper portion. Two through holes 46 are formed in a side wall of the circular truncated cone portion 22b, upward short tubes 47 are connected to the through holes 46, an upper end opening of one short tube 47 is formed as a first opening 49, and an upper end opening of another short tube 47 is formed as a second opening 50.

A thread hole 23 with a horizontal axis is formed in an upper portion of the tube portion 22a of the lower member 22, a screw 24 is engaged with the thread hole 23, and the lower member 22 is fixed to the upper tube 21 by pressing a leading end of the screw 24 to the upper tube 21. On the other hand, the lower member 22 can be moved vertically by loosening the screw 24. In this case, the structure may be made such that annular grooves are formed on an outer peripheral surface of the upper tube 21 at a predetermined interval in a height direction, whereby the leading end of the screw 24 is fitted to the annular groove, and the lower member 22 is firmly fixed.

In the present embodiment, the powder body within the metering container 32 is discharged from the first opening 49, and the other metering apparatus, transport pipe, gas pump (not shown) and the like are connected such that the gas or the powder body fed from the other metering apparatus (not shown) enters from the second opening 50.

The switch valve 36 has a casing 40 in which an inlet 41 is provided in an upper portion and an outlet 42 lapping over the inlet 41 in a plan view is provided in a lower portion, and a slide plate 44 horizontally slidable in a direction vertical to the paper surface in FIG. 1 with respect to the casing 40 and having a through hole 45.

[Operation of First Embodiment]

Next, a description will be given of a first operation of the first embodiment.

First, an internal capacity of the metering container 32 is made to a set value by adjusting a height position of the lower member 22 with respect to the upper tube 21. In this case, since it is possible to prevent a part of the powder body entering into the metering container 32 from running over into the short tube 47, or it is possible to approximately define an overflowing amount even if the powder body runs over, by designing a shape (an angle α in FIG. 1) of the circular truncated cone portion 22b with taking an angle of repose or the powder body or the like into consideration, it is preferable to determine a capacity of the metering container 32 taking the condition into consideration.

Thereafter, when opening the check valve 36 after charging the powder body to the reservoir hopper 1, the powder body flows into the metering container 32, and an inner side of the metering container 32 is filled with the powder body.

Thereafter, the check valve 36 is closed.

Thereafter, by generating the gas stream toward the first opening 49 from the second opening 50, the powder body within the metering container 32 is discharged from the first opening 49 and is fed to a predetermined place.

Thereafter, the check valve 36 is again opened.

The same operations are carried out sequentially.

Next, a description will be given of a second operation of the first embodiment.

Since the powder body outlet of the metering container of the other metering apparatus is connected to the second opening 50, whereby the powder body transport system is constructed, the powder body within the metering container of the other metering apparatus can be transported to the predetermined place via the illustrated metering container 32, by finishing the discharge of the powder body within the metering container 32, thereafter keeping the switch valve 36 in the closed state, filling the powder body in the metering container of the other metering apparatus and thereafter generating the gas stream toward the first opening 49 from the second opening 50. In short, the metering container 32 can be utilized as a part of the transport pipe.

Second Embodiment

Figure 2:
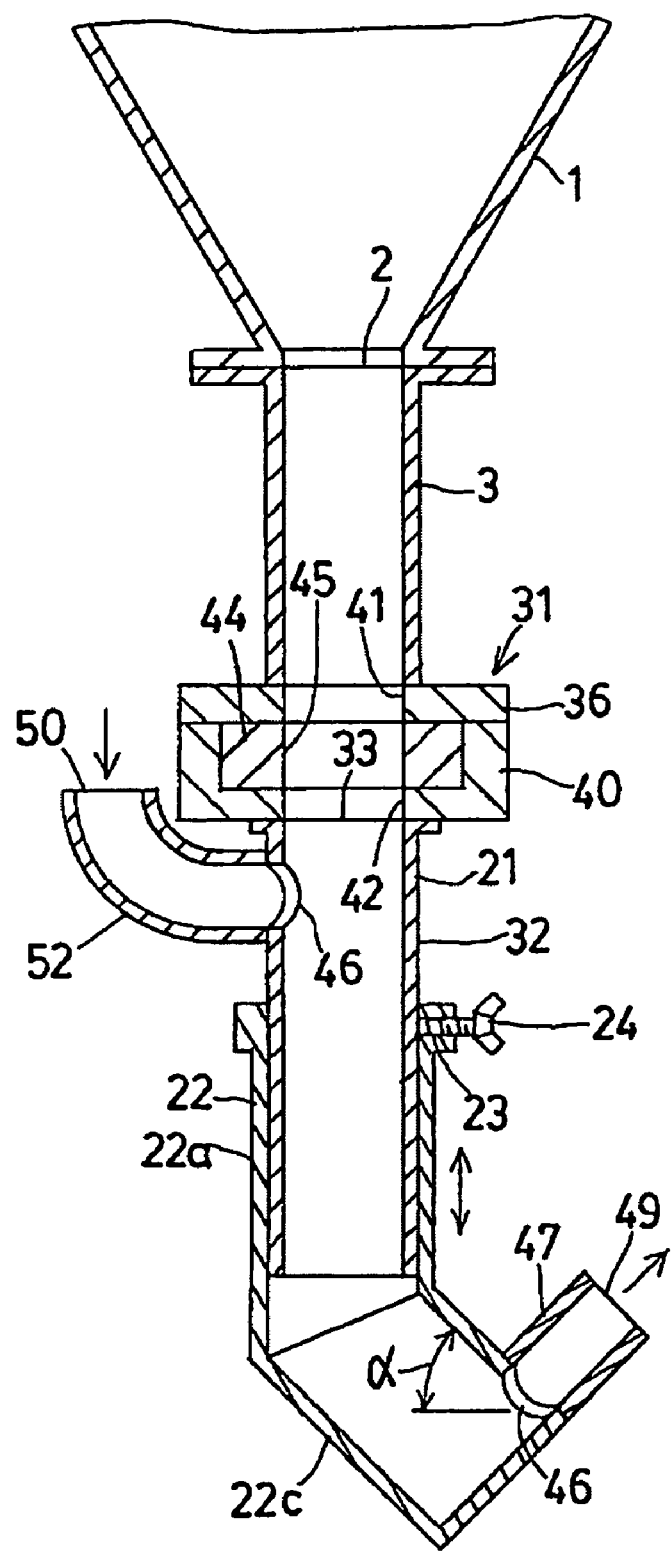
FIG. 2 is a cross sectional view of a main portion showing a second embodiment in accordance with the present invention.

Refer to FIG. 2

The lower member 22 has a tube portion 22a with a vertical axis, and an upward opened closed-end slope tube portion 22c which is connected to a lower end of the tube portion 22a and has an inclined axis.

A through hole 46 is formed in an upper side wall of the tube portion 22a, and an upward curved short tube 52 is connected to the through hole 46. An upper end opening of the short tube 52 is formed as a second opening 50. Further, a through hole 46 is formed in a side peripheral wall of the slope tube portion 22c, an upward short tube 47 is connected to the through hole 46, and an upper end opening of the short tube 47 is formed as a first opening 49.

It is possible to prevent a part of the powder body entering into the metering container 32 from running over into the short tube 47, or it is possible to approximately define an overflowing amount even if the powder body runs over, by designing an angle of incline (an angle α in FIG. 2) of the slope tube portion 22c with taking an angle of repose or the like into consideration. Further, a part of the powder body entering into the metering container 32 runs over into the short tube 52, however, the overflowing amount is determined on the basis of the kind of the powder body. Under these circumstances, the metering container 32 functions as a metering container.

In the present embodiment, the powder body within the metering container 32 flows out from the first opening 49, and the other metering apparatus, transport pipe, gas pump (not shown) and the like are connected such that the gas or the powder body fed from the other metering apparatus (not shown) enters from the second opening 50.

An operation of the second embodiment is the same as the operation of the first embodiment.

Third Embodiment

Figure 3:
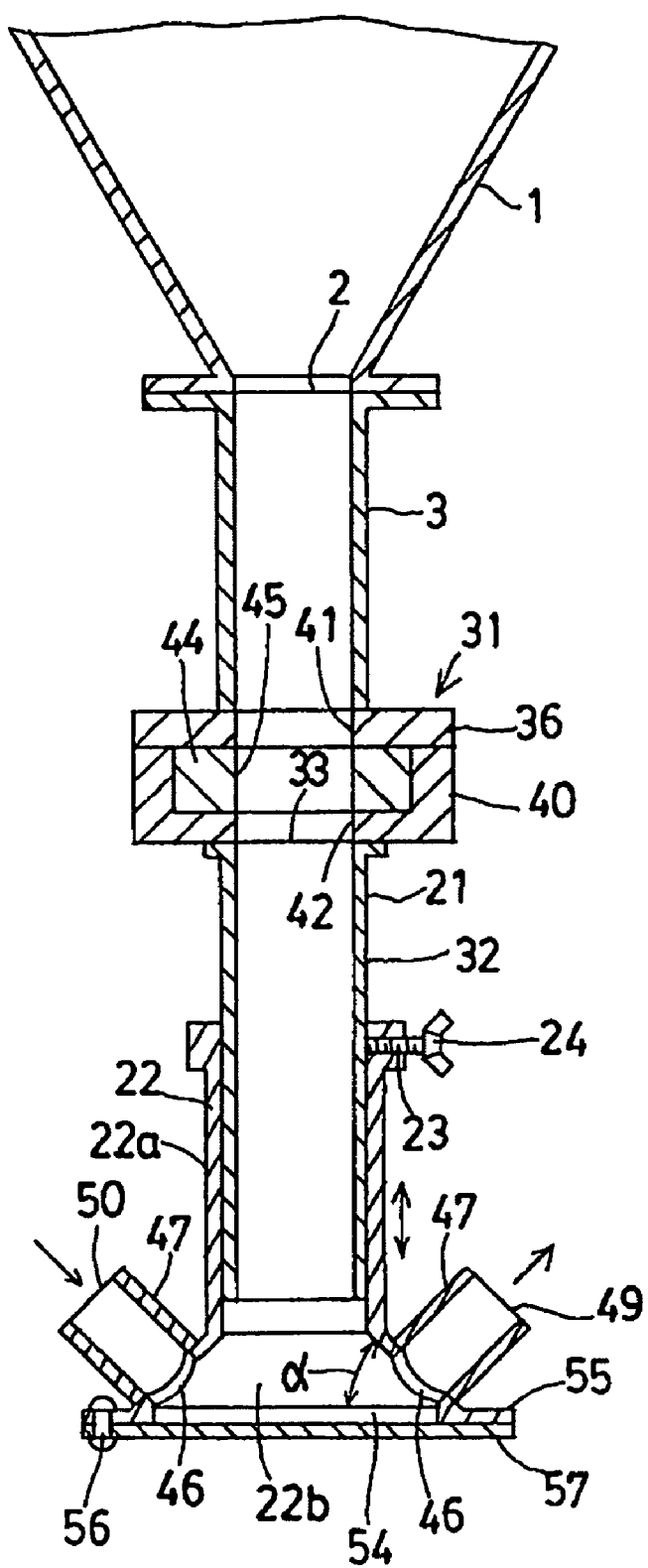
FIG. 3 is a cross sectional view of a main portion showing a third embodiment in accordance with the present invention.

Refer to FIG. 3

A powder body discharge port 54 is formed in a lower portion of the circular truncated cone portion 22b of the lower member 22, an outward protruding flange 55 is formed in an edge portion of the powder body discharge port 54, and a closing member 57 is provided in the flange so as to be freely swingable horizontally via a support shaft 56 with a vertical axis. The closing member 57 can horizontally swing between a position at which the powder body discharge port 54 is completely closed, and a position at which the powder body discharge port 54 is completely opened, thereby closing and opening the powder body discharge port 54. In this case, the closing member 57 is structured such as to be locked to the circular truncated cone portion 22b by a known lock apparatus (not shown) at the position at which the powder body discharge port 54 is completely closed. In accordance with the structure mentioned above, a weight or the like of the powder body metered by the metering container 32 can be easily measured and confirmed by opening the powder body discharge port 54 so as to discharge the powder body within the metering container 32 from the powder body discharge port 54.

An operation of the third embodiment is the same as the operation of the first embodiment.

Fourth Embodiment

Figure 4:
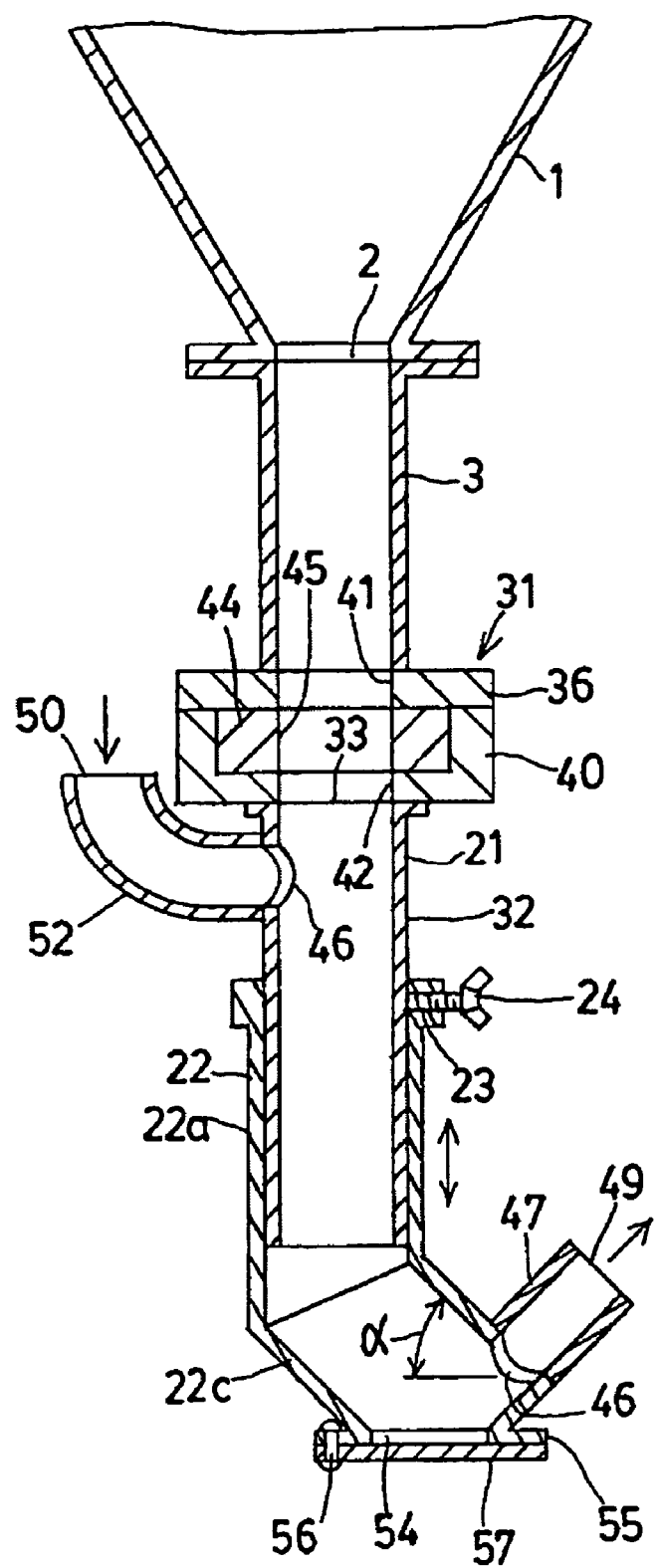
FIG. 4 is a cross sectional view of a main portion showing a fourth embodiment in accordance with the present invention.

Refer to FIG. 4

A powder body discharge port 54 is formed in a lower portion of the slope tube portion 22*c*, an outward protruding flange 55 is formed in an edge portion of the powder body discharge port 54, and a closing member 57 is provided in the flange 55 so as to be freely swingable horizontally via a support shaft 56 with a vertical axis. The closing member 57 can horizontally swing between a position at which the powder body discharge port 54 is completely closed, and a position at which the powder body discharge port 54 is completely opened, thereby closing and opening the powder body discharge port 54. In this case, the closing member 57 is structured such as to be locked to the slope tube portion 22*c* by a known lock apparatus (not shown) at the position at which the powder body discharge port 54 is completely closed. In accordance with the structure mentioned above, a weight or the like of the powder body metered by the metering container 32 can be easily measured and confirmed by opening the powder body discharge port 54 so as to discharge the powder body within the metering container 32 from the powder body discharge port 54.

An operation of the fourth embodiment is the same as the operation of the first embodiment.

A description will be given below of modified embodiments.

(1) The powder body includes a fine particle, a granular body, a micro thin piece, a short fiber piece, a sliver and the like.

(2) The metering apparatus 31 is optionally used.

(3) The metering apparatus may be optionally structured as far as the internal capacity is variable.

(4) In the case of the powder body having a large bulk density in the second or fourth embodiment, the powder body can be smoothly discharged by discharging the powder body from the first opening 49 in the lower portion. On the other hand, in the case of the powder body having a small bulk density, the powder body may be discharged from the second opening 50. In this case, even in the case of the powder body having the large bulk density, the powder body can be discharged from the second opening 50 by increasing a gas flow speed.

(5) The mechanism of freely opening and closing the closing member 57 with respect to the powder body discharge port 54 is optionally structured. In this case, in order to improve an airtightness between the powder body discharge port 54 and the closing member 57, it is preferable to mount an annular packing to the edge of the powder body discharge port 54.

(6) It goes without saying that the porous body (which does not allow the powder body having the set magnitude to pass through but allows the gas to pass through) is provided in one of the first opening 49 and the second opening 50, whereby the opening provided with the porous body is set as the gas inflow port and another opening is set as the powder body outlet, and accordingly the metering apparatus of the powder body can be used.

In each embodiment disclosed herein, the first opening 49 communicates with the second opening 50 through the metering container 32.

INDUSTRIAL APPLICABILITY

The present invention is suitable for metering and supplying a powder body of a synthetic resin raw material to an injection molding machine, in a molding system of a synthetic resin product.

What is claimed is:

1. A powder body metering apparatus comprises a metering container including:
    a first hollow cylinder including an inlet in an upper end thereof; and
    a separate second hollow cylinder arranged so as to be freely adjustable in position with respect to the first hollow cylinder; and
    a switch valve for opening and closing the inlet of the metering container,
    wherein said first hollow cylinder and said second hollow cylinder are slidably inserted one inside the other,
    wherein an internal capacity of said metering container is variable by translating or linearly shifting the second hollow cylinder with respect to the first hollow cylinder,
    wherein a first opening is provided in a lower portion of the metering container and a separate second opening is provided in a desired portion, and
    wherein said first opening and said second opening are each spaced from said inlet, said first opening communicating with said second opening through said metering container.

2. A powder body metering apparatus as claimed in claim 1, wherein a powder body discharge port is formed in the lower portion of the metering container, and the powder body discharge port is freely opened and closed by a closing member.

* * * * *